United States Patent
Kamachi et al.

(10) Patent No.: US 10,160,441 B2
(45) Date of Patent: *Dec. 25, 2018

(54) POWER CONTROLLER OF HYBRID VEHICLE

(71) Applicant: MITSUBISHI JIDOSHA KOGYO KABUSHIKI KAISHA, Tokyo (JP)

(72) Inventors: Makoto Kamachi, Tokyo (JP); Ryo Shimizu, Tokyo (JP); Norihiko Ikoma, Tokyo (JP); Hironori Abe, Tokyo (JP); Naoki Miyamoto, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/460,539

(22) Filed: Mar. 16, 2017

(65) Prior Publication Data

US 2017/0282894 A1    Oct. 5, 2017

(30) Foreign Application Priority Data

Mar. 30, 2016   (JP) ................ 2016-068409

(51) Int. Cl.
*B60W 20/13* (2016.01)
*B60K 6/387* (2007.10)
(Continued)

(52) U.S. Cl.
CPC ............ *B60W 20/13* (2016.01); *B60K 6/387* (2013.01); *B60K 6/442* (2013.01); *B60K 6/448* (2013.01);
(Continued)

(58) Field of Classification Search
USPC .......................................... 701/22
See application file for complete search history.

(56) References Cited

U.S. PATENT DOCUMENTS

| 2008/0143188 A1* | 6/2008 | Adest | H02J 1/102 |
|---|---|---|---|
| | | | 307/82 |
| 2011/0012542 A1* | 1/2011 | Inamura | H02M 1/08 |
| | | | 318/139 |

(Continued)

FOREIGN PATENT DOCUMENTS

| JP | 2007-325352 A | 12/2007 |
| JP | 2009-219200 A | 9/2009 |
| JP | 2012-51515 A | 3/2012 |

OTHER PUBLICATIONS

Extended European Search Report issued in corresponding EP Application No. 17163700.2 dated Sep. 26, 2017.

*Primary Examiner* — Tyler D Paige

(74) *Attorney, Agent, or Firm* — Birch, Stewart, Kolasch & Birch, LLP

(57) ABSTRACT

A power controller of a hybrid vehicle includes: a first drive motor that drives any one of a front wheel and a rear wheel of a vehicle; an engine that drives the one wheel or the corresponding other one of the front wheel and the rear wheel of the vehicle through a clutch; a generator that is driven by the engine; and a voltage transformer that steps down generated electric power supplied to the first drive motor and a battery from the generator. The power controller limits passing power of the voltage transformer according to the temperature of the voltage transformer, and connects the clutch when the passing power of the voltage transformer is limited.

9 Claims, 4 Drawing Sheets

(51) Int. Cl.
*B60K 6/442* (2007.10)
*B60L 11/14* (2006.01)
*B60L 11/18* (2006.01)
*B60W 20/40* (2016.01)
*B60K 6/448* (2007.10)
*B60W 10/02* (2006.01)
*B60W 10/06* (2006.01)
*B60W 10/08* (2006.01)
*B60W 10/26* (2006.01)
*B60W 20/20* (2016.01)
*B60W 20/50* (2016.01)
*B60K 1/02* (2006.01)
*B60K 6/52* (2007.10)

(52) U.S. Cl.
CPC .......... *B60L 11/14* (2013.01); *B60L 11/1861* (2013.01); *B60W 10/02* (2013.01); *B60W 10/06* (2013.01); *B60W 10/08* (2013.01); *B60W 10/26* (2013.01); *B60W 20/20* (2013.01); *B60W 20/40* (2013.01); *B60W 20/50* (2013.01); *B60K 1/02* (2013.01); *B60K 6/52* (2013.01); *B60L 2210/12* (2013.01); *B60L 2210/14* (2013.01); *B60L 2240/44* (2013.01); *B60L 2240/507* (2013.01); *B60L 2240/525* (2013.01); *B60L 2240/54* (2013.01); *B60W 2510/244* (2013.01); *B60W 2710/021* (2013.01); *B60W 2710/06* (2013.01); *B60W 2710/0677* (2013.01); *B60W 2710/086* (2013.01); *B60W 2710/244* (2013.01); *B60Y 2300/91* (2013.01); *B60Y 2400/112* (2013.01); *Y02T 10/6234* (2013.01); *Y02T 10/6243* (2013.01); *Y02T 10/6265* (2013.01); *Y02T 10/6286* (2013.01); *Y10S 903/93* (2013.01)

(56) References Cited

U.S. PATENT DOCUMENTS

| | | | |
|---|---|---|---|
| 2012/0130577 A1* | 5/2012 | Ichimoto | B60W 20/00 701/22 |
| 2013/0134924 A1* | 5/2013 | Kanakasabai | B60L 1/003 320/104 |
| 2013/0282220 A1 | 10/2013 | Tachikawa | |
| 2015/0251543 A1* | 9/2015 | Kaihara | B60L 11/08 307/10.1 |
| 2015/0321573 A1* | 11/2015 | Sato | H02P 27/085 701/22 |
| 2016/0114788 A1* | 4/2016 | Kamatani | B60K 6/445 701/22 |
| 2016/0254212 A1* | 9/2016 | Kusaka | H01L 23/34 361/699 |
| 2017/0282894 A1* | 10/2017 | Kamachi | B60W 20/13 |
| 2017/0282905 A1* | 10/2017 | Miyamoto | B60W 20/40 |

* cited by examiner

POWER CONTROLLER OF HYBRID VEHICLE

BACKGROUND OF THE INVENTION

Field of the Invention

The present invention relates to a power controller of a hybrid vehicle, and specifically to a power controller of a hybrid vehicle equipped with a power converter (boost converter) that steps up electric power of a drive battery, and supplies it to a drive motor.

Description of the Related Art

For example, a hybrid vehicle whose drive mode is switchable between series mode and parallel mode is constructed with a drive motor connected to a drive wheel and an engine also connected to the drive wheel through a clutch. In series mode, the vehicle travels by disconnecting the clutch to drive a motor generator by the engine, and using the generated electric power to drive the drive motor, as well as to charge a drive battery with surplus power. Meanwhile, in parallel mode, the vehicle travels by connecting the clutch to transmit driving force of the engine to the drive wheel, or also transmitting driving force of the drive motor to the drive wheel in addition to the driving force of the engine.

Incidentally, as described in Japanese Patent Laid-Open No. 2007-325352, for example, in hybrid vehicles brought into actual use in recent years, electric power of a drive battery is not only converted from DC to AC by an inverter, but is also stepped up by a boost converter to improve efficiency of a drive motor, an inverter, and the like. The boost converter has a function not only of stepping up electric power from the drive battery, but also of stepping down electric power generated by the motor generator in the aforementioned series mode, for example. The stepped-down electric power is used to charge the drive battery.

However, the above-mentioned hybrid vehicle suffers from a problem such that a power limit, which is imposed to prevent the boost converter from being overheated, reduces the charged amount of the drive battery, and therefore shortens the cruising range of the vehicle.

For example, an increase in electric power stepped up or stepped down through the boost converter (hereinafter referred to as passing power), or operation and the like in high temperature environment increases the temperature of the boost converter and may cause malfunction due to overheating. Hence, to protect parts, a countermeasure is taken to limit passing power in a certain high temperature range. Such a power limit is imposed not only on electric power supplied from the drive battery to the drive motor, but also on electric power generated by the motor generator in the aforementioned series mode or the like.

Accordingly, even though one of the objectives of switching to series mode has originally been to charge the drive battery, the battery charging itself is left unachieved. As a result, the SOC (state of charge) of the drive battery is lowered, whereby the cruising range of the vehicle is shortened.

SUMMARY OF THE INVENTION

An objective of the present invention is to provide a power controller of a hybrid vehicle that can protect a boost converter by limiting passing power when the temperature of the boost converter rises, and can also ensure a sufficient cruising range of the vehicle by avoiding reduction in the charged amount of a drive battery due to the limitation of passing power, while maintaining the traveling state of the vehicle at that point.

To achieve the above objective, a power controller of a hybrid vehicle of the present invention includes: a first drive motor that drives any one of a front wheel and a rear wheel of a vehicle; an engine that drives the one wheel or the corresponding other one of the front wheel and the rear wheel of the vehicle through a clutch; a generator that is driven by the engine; and a voltage transformer that steps down generated electric power supplied to the first drive motor and a battery from the generator, wherein the power controller further includes a limitation part that limits passing power of the voltage transformer according to the temperature of the voltage transformer, and a connection part that switches connection of the clutch; and the connection part connects the clutch when the passing power of the voltage transformer is limited by the limitation part.

According to the power controller of a hybrid vehicle configured in this manner, the engine drives the generator, and the generated electric power is stepped down by the voltage transformer to be supplied to the first drive motor and the battery. Although the charged amount of the battery decreases by limiting the passing power according to the temperature of the voltage transformer, in the present invention, the clutch is connected at this time to drive one or the other wheel by the engine. As a result, power supply to the first drive motor side is stopped, and passing power of the voltage transformer drops.

The lowered passing power lowers the temperature of the voltage transformer, and reduces the power limit imposed by the limitation part. For example, even if the battery need not be charged at this time, charging may be required later. However, since the power limit imposed on the voltage transformer will be reduced at that point, the battery can be charged through the voltage transformer without hindrance, so that reduction of the charged amount of the battery can be avoided.

As has been described, according to the power controller of a hybrid vehicle of the present invention, a voltage transformer can be protected by limiting passing power when the temperature of the voltage transformer rises, and a sufficient cruising range of the vehicle can be ensured by avoiding reduction in the charged amount of a battery due to the limitation of passing power, while maintaining the traveling state of the vehicle at that point.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

Hereinafter, a description will be given of an embodiment in which the present invention is embodied as a power controller of a plug-in hybrid vehicle (hereinafter referred to as vehicle 1).

Figure 1:
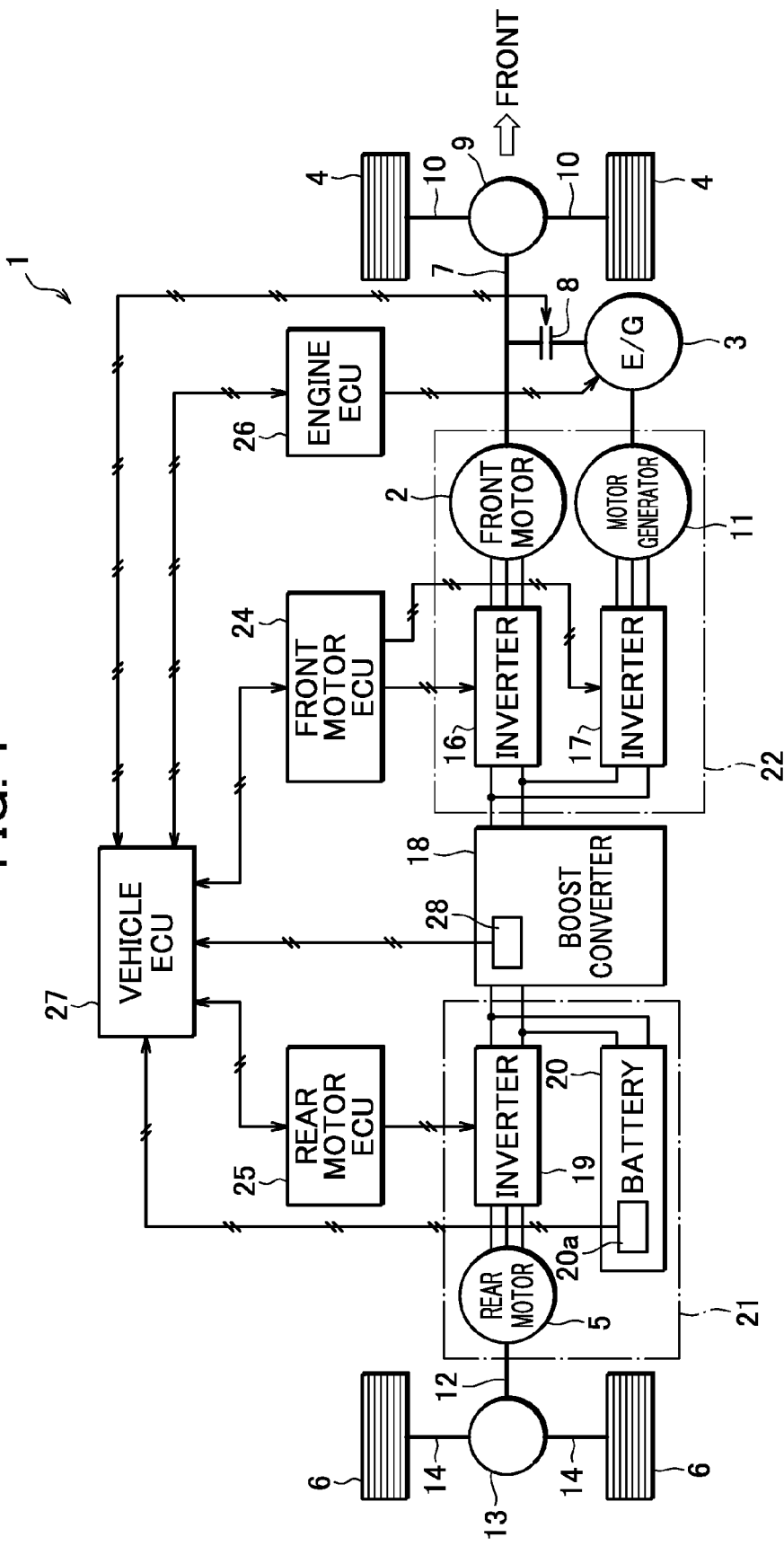
FIG. 1 is an overall configuration diagram of a plug-in hybrid vehicle to which a power controller of an embodiment of the present invention is applied.

FIG. 1 is an overall configuration diagram of the plug-in hybrid vehicle to which the power controller of the embodiment is applied.

The vehicle 1 of the embodiment is a four-wheel drive vehicle configured to drive front wheels 4 (second drive wheel) by an output of a front motor 2 (second drive motor) or outputs of the front motor 2 and an engine 3, and drive rear wheels 6 (first drive wheel) by an output of a rear motor 5 (first drive motor).

An output shaft of the front motor 2 is connected to a drive shaft 7 of the front wheels 4, and the engine 3 is also connected to the drive shaft 7 through a clutch 8. Moreover, the front wheels 4 are connected to the drive shaft 7 through a front differential 9 and right and left drive shafts 10. Driving force of the front motor 2 and driving force of the engine 3 when the clutch 8 is connected are transmitted to the front wheels 4 through the drive shaft 7, the front differential 9, and the right and left drive shafts 10, and generate driving force for the vehicle to run, in the front wheels 4. A motor generator (generator) 11 is connected to an output shaft of the engine 3. The motor generator 11 can arbitrarily generate electric power by being driven by the engine 3 regardless of whether or not the clutch 8 is connected, and also functions as a starter for starting the engine 3 from a stopped state when the clutch 8 is disconnected.

Meanwhile, an output shaft of the rear motor 5 is connected to a drive shaft 12 of the rear wheels 6, and the rear wheels 6 are connected to the drive shaft 12 through a rear differential 13 and right and left drive shafts 14. Driving force of the rear motor 5 is transmitted to the rear wheels 6 through the drive shaft 12, the rear differential 13, and the right and left drive shafts 14, and generates driving force for the vehicle to run, in the rear wheels 6.

Inverters 16, 17 are connected to the front motor 2 and the motor generator 11, respectively, and the inverters 16, 17 are connected to a boost converter (voltage transformer) 18. An inverter 19 is connected to the rear motor 5, and the inverter 19 and a drive battery 20 are connected to the boost converter 18. The drive battery 20 is formed of a secondary battery such as a lithium ion battery, and includes a battery monitoring unit 20a (estimation part) that calculates its SOC (state of charge), and detects its temperature TBAT.

The operating voltage differs between rear and front sides of the boost converter 18. The rear motor 5 and the inverter 19 are designed to operate at a voltage (e.g., 300V) of the drive battery 20 to form a low voltage circuit 21 with the drive battery 20, while the front motor 2, the motor generator 11, and their inverters 16, 17 are designed to operate at a higher voltage (e.g., 600V) to improve efficiency, to form a high voltage circuit 22.

The boost converter 18 has a function of stepping up and down the voltage when electric power is exchanged between the circuits 21, 22. For example, the boost converter 18 steps up the low voltage-side DC power discharged from the drive battery 20 and supplies it to the inverter 16, so that the three-phase AC power converted by the inverter 16 drives the front motor 2, and the three-phase AC power similarly converted by the inverter 17 causes the motor generator 11 to function as a starter. Additionally, the three-phase AC power generated by the motor generator 11 is converted into high voltage-side DC power by the inverter 17, and the boost converter 18 steps down the DC power to charge the drive battery 20. The DC power stepped down by the boost converter 18 is also converted into three-phase AC power by the inverter 19, and is supplied to drive the rear motor 5.

Note that electric power is exchanged in each of the circuits 21, 22 without passing through the boost converter 18. For example, on the low voltage circuit 21 side, DC power discharged from the drive battery 20 is converted into three-phase AC power by the inverter 19 and supplied to the rear motor 5. Conversely, three-phase AC power regenerated by the rear motor 5 is converted into DC power by the inverter 19, and is used to charge the drive battery 20. In addition, three-phase AC power generated by the motor generator 11 on the high voltage circuit 22 side is converted into DC power by the inverter 17, and is then converted back into three-phase AC power by the inverter 16 to be supplied to the front motor 2.

A front motor ECU 24 is connected to each of the inverters 16, 17 on the high voltage circuit 22 side, and the front motor ECU 24 switches the inverters 16, 17 to control the above-mentioned operation of the front motor 2 and the motor generator 11. Meanwhile, a rear motor ECU 25 is connected to the inverter 19 on the low voltage circuit 21 side, and the rear motor ECU 25 switches the inverter 19 to control the above-mentioned operation of the rear motor 5.

An engine ECU 26 is connected to the engine 3, and the engine ECU 26 controls the throttle position, fuel injection amount, ignition timing, and the like of the engine 3, to operate the engine 3.

Note that although not shown in FIG. 1, the drive battery 20 includes a charger, and the charger can be used to arbitrarily charge the drive battery 20 with electric power supplied from an external power source.

The front motor ECU 24, rear motor ECU 25, and engine ECU 26 described above are connected to a vehicle ECU 27 which is a higher-level unit. Each of The ECUs 24 to 27 is formed of an input/output device, a storage device (e.g., ROM, RAM, or nonvolatile RAM), a central processing unit (CPU), and the like. Note that the nonvolatile RAM of each storage device stores instructions for various later-mentioned control performed by each CPU.

The vehicle ECU 27 is a control unit for performing general control of the vehicle 1, and lower-level ECUs 24 to 26 having received instructions from the vehicle ECU 27 control the aforementioned operation of the front motor 2, motor generator 11, rear motor 5, and engine 3. Hence, the battery monitoring unit 20a of the drive battery 20, a temperature sensor 28 for detecting a temperature $T_{cvtr}$ of the boost converter 18, and unillustrated sensors such as an accelerator pedal position sensor for detecting the accelerator pedal position and a speed sensor for detecting a vehicle speed V are connected to the input side of the vehicle ECU 27. Additionally, operation states of the front motor 2, motor generator 11, rear motor 5, and engine 3 are input to the input side of the vehicle ECU 27 through the ECUs 24 to 26.

In addition to the aforementioned front motor ECU 24, rear motor ECU 25, and engine ECU 26, the clutch 8 and boost converter 18 are connected to the output side of the vehicle ECU 27.

The vehicle ECU 27 switches the drive mode of the vehicle 1 among EV mode, series mode and parallel mode, on the basis of the aforementioned various detection amounts and operation information of the accelerator pedal position sensor and the like. For example, the drive mode is set to parallel mode in ranges such as a high speed range where efficiency of the engine 3 is high. In medium to low speed ranges, the drive mode is switched between EV mode and series mode depending on the SOC and the like of the drive battery 20.

In EV mode, the clutch 8 is disconnected and the engine 3 is stopped, so that electric power from the drive battery 20 drives the front wheels 4 through the front motor 2, and drives the rear wheels 6 through the rear motor 5 to drive the vehicle 1. In series mode, the clutch 8 is disconnected to separate the engine 3 from the front wheels 4 side, and the engine 3 is operated to drive the motor generator 11. The generated electric power drives the front wheels 4 through the front motor 2 and drives the rear wheels 6 through the rear motor 5 to drive the vehicle 1, and also charges the drive battery 20 with surplus power.

In parallel mode, the clutch 8 is connected and the engine 3 is operated to transmit driving force to the front wheels 4. When the engine driving force is insufficient, battery power is used to drive the front motor 2 or the rear motor 5. In addition, when charging is required because the SOC of the drive battery 20 is low, the engine 3 drives the motor generator 11, and the generated electric power is used to charge the drive battery 20.

When electric power is thus exchanged between the high and low voltage circuits 21, 22, the boost converter 18 steps up and down the voltage in the aforementioned manner, as a matter of course.

Additionally, the vehicle ECU 27 calculates a total required output for travel of the vehicle 1, on the basis of the aforementioned various detection amounts and operation information. The vehicle ECU 27 distributes the total required output to the front motor 2 side and the rear motor 5 side in EV mode and series mode, and to the front motor 2 side, the engine 3 side, and the rear motor 5 side in parallel mode. Then, the vehicle ECU 27 sets a required torque for each of the front motor 2, the rear motor 5, and the engine 3 on the basis of the distributed required output and the like, and outputs an instruction signal to the front motor ECU 24, rear motor ECU 25, and engine ECU 26, so that the respective required torques can be achieved.

According to the instruction signal from the vehicle ECU 27, the front motor ECU 24 and the rear motor ECU 25 calculate a target current value to apply to a coil of each phase of the front motor 2 and the rear motor 5 to achieve the required torque. Thereafter, the front motor ECU 24 and the rear motor ECU 25 switch the respective inverters 16, 19, according to the target current values, to achieve the required torque. Note that a similar operation is performed when the motor generator 11 generates electric power. Here, the front motor ECU 24 switches the inverter 17, according to the target current value calculated from the required torque on the negative side, to achieve the required torque.

According to the instruction signal from the vehicle ECU 27, the engine ECU 26 calculates a target value of the throttle position, fuel injection amount, ignition timing and the like for achieving the required torque, and controls operation of the engine 3 on the basis of the target values to achieve the required torque.

Meanwhile, the vehicle ECU 27 controls the boost converter 18 to step up and down the voltage of electric power exchanged between the high and low voltage circuits 21, 22. Although stepping up and down the voltage improves efficiency of the front motor 2 and the motor generator 11 as well as their inverters 16, 17, for example, the boost converter 18 consumes power with its operation. For this reason, the boost converter 18 is activated in a high speed-heavy load range of the front motor 2 or the motor generator 11 where particularly high efficiency can be achieved or high power is required, and the boost converter 18 is stopped in other operation ranges.

Also, since an increase in passing power of the boost converter 18 or operation and the like in high temperature environment increases the temperature of the boost converter 18 and may cause malfunction, the vehicle ECU 27 limits passing power (limitation part) according to the temperature of the boost converter 18. Specifically, the vehicle ECU 27 limits passing power by calculating, according to a map shown in FIG. 2, a limit value $W_{limit}$ (hereinafter referred to as power limit value) of passing power on the basis of the temperature $T_{cvtr}$ of the boost converter 18 detected by the temperature sensor 28, and limiting electric power generated by the motor generator 11, for example, by using the power limit value $W_{limit}$ as an upper limit.

Figure 2:
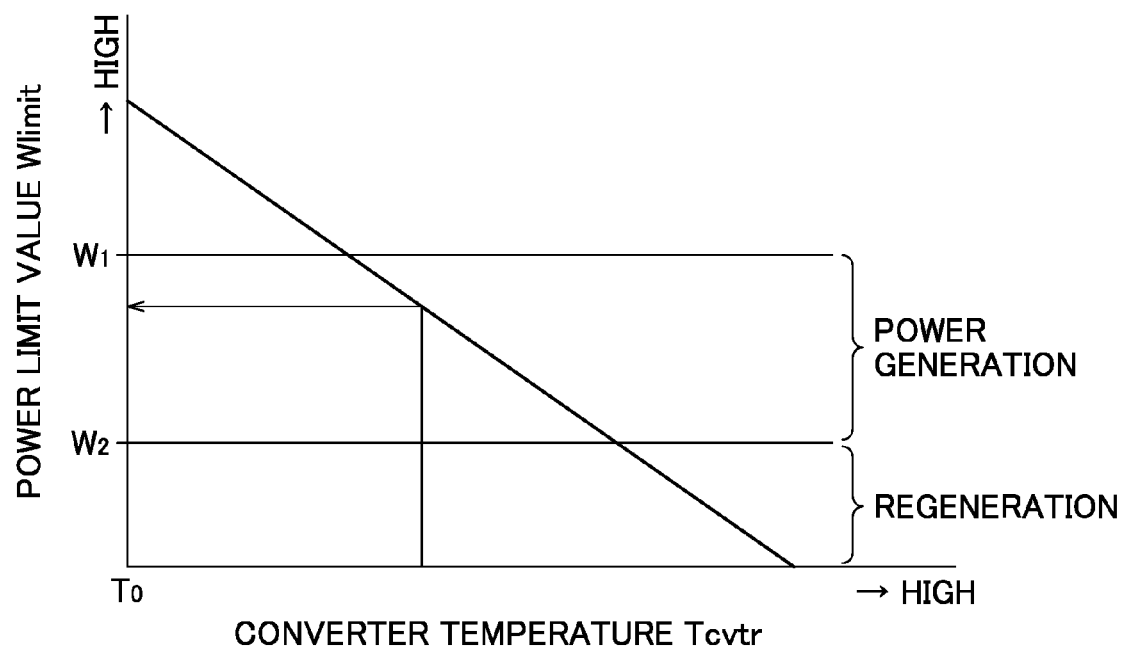
FIG. 2 is a diagram showing a map for calculating a power limit value $W_{limit}$ on the basis of a temperature $T_{cvtr}$ of a boost converter.

As can be seen from FIG. 2, a power limit is imposed in a temperature range equal to or higher than a lowest temperature T0 at which the temperature rise may cause malfunction of the boost converter 18, and temperature rise is suppressed by setting a lower power limit value $W_{limit}$ for a higher temperature $T_{cvtr}$ of the boost converter 18. However, as has been mentioned in Description of the Related Art, there is a problem that imposing the power limit on the boost converter 18 during series mode reduces charged amount of the drive battery 20 and lowers the SOC, and therefore shortens the cruising range of the vehicle 1.

In view of the above problem, the inventors of the present invention focused on the point that since the electric power limited in the boost converter 18 in series mode is electric power to be supplied to the rear motor 5 and the drive battery 20, by reducing the amount of electric power to be supplied to the rear motor 5, the electric power for the reduced amount can be used to charge the drive battery 20. Additionally, considering that continuation of series mode with the rear motor 5 in the stopped state deteriorates efficiency of the motor generator 11, inverters 16, 17, and front motor 2, and therefore hinders transmission of the entire driving force of the engine 3 to the front wheels 4, the drive mode is switched from series mode to parallel mode. According to this observation, a description will be given below of power control performed by the vehicle ECU 27 when the temperature of the boost converter 18 rises.

Figure 3:
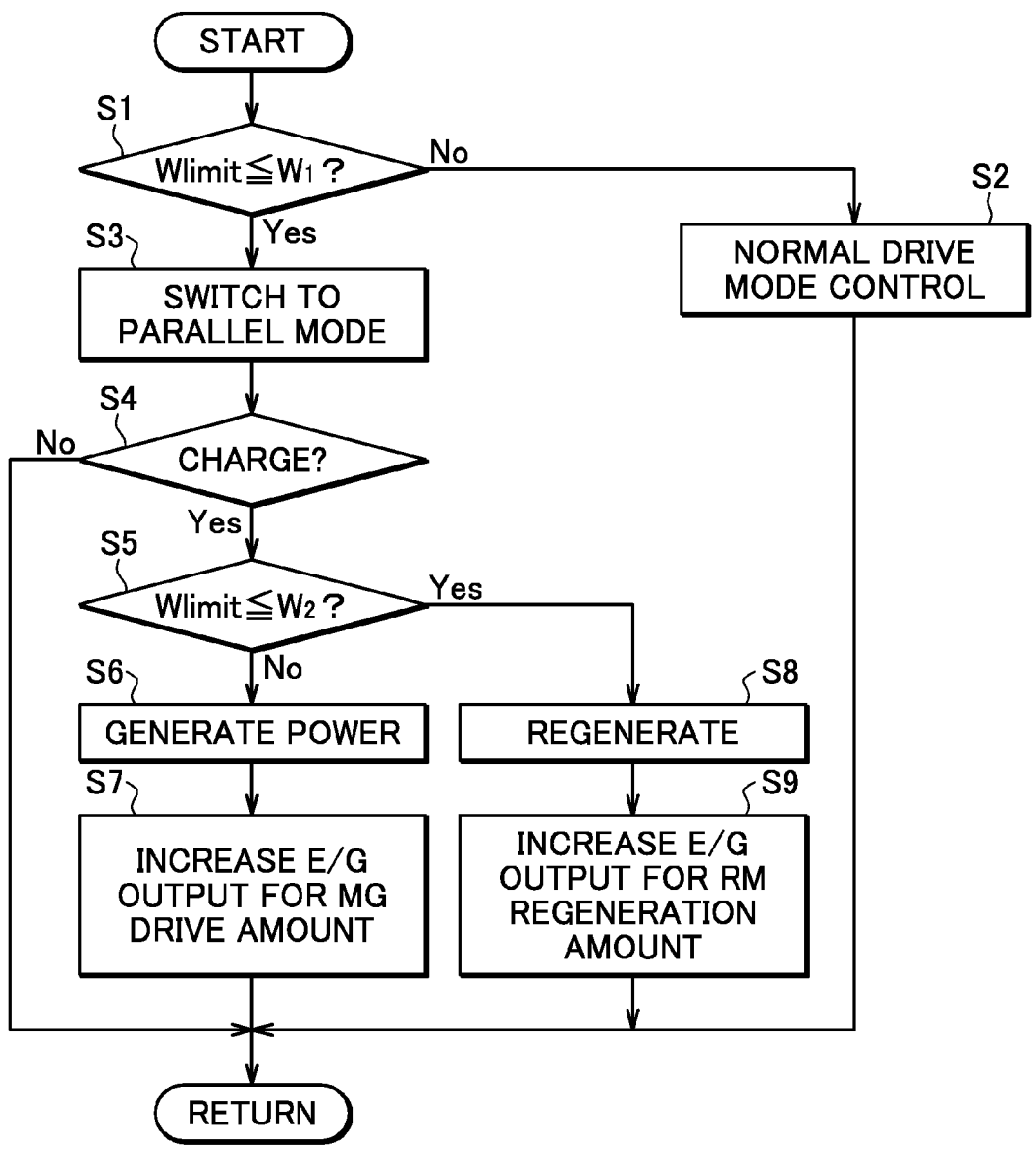
FIG. 3 is a flowchart showing a power control routine executed by a vehicle ECU.

FIG. 3 is a flowchart showing a power control routine executed by the vehicle ECU 27.

The description is given under the assumption that the vehicle 1 is traveling while series mode is selected as the drive mode, and a power limit is imposed on the boost converter 18 according to the power limit value $W_{limit}$, since the current converter temperature $T_{cvtr}$ is equal to or higher than the lower limit temperature T0.

First, in step S1, the vehicle ECU 27 determines whether or not the power limit value $W_{limit}$ used for the power limit is equal to or lower than a preset first determination value W1. The first determination value W1 is set as the maximum electric power that hinders charging of the drive battery 20. Hence, if the power limit value $W_{limit}$ exceeds the first determination value W1, it is regarded that charging of the drive battery 20 is not hindered even if a limit is imposed on the passing power stepped down through the boost converter 18. Accordingly, it is determined "No" in step S1, and the routine proceeds to step S2.

In step S2, a normal drive mode-switching control is performed. For example, in a high speed range where efficiency of the engine 3 is high, the drive mode is switched to parallel mode. In other speed ranges, if the SOC of the drive battery 20 is equal to or higher than a predetermined value, the drive mode is switched to EV mode, and if the SOC is lower than the predetermined value, the drive mode is switched to series mode, and the routine is temporarily ended.

Meanwhile, if the power limit value $W_{limit}$ is equal to or lower than the first determination value W1 (This corresponds to "when passing power of the voltage transformer is limited" in the present invention), it is determined "Yes" in step S1, and the driving mode is switched to parallel mode in step S3 (connection part). In other words, the engine 3 is operated after connecting the clutch 8, so that the driving force of the engine 3 can be transmitted to the front wheels 4. Switching to parallel mode stops the front motor 2 and rear motor 5, so that the vehicle 1 is driven only by driving force of the engine 3 mechanically connected to the front wheels 4. In the next step S4, it is determined whether or not the drive battery 20 needs to be charged by referring to the SOC, and if not, the routine is temporarily ended.

Meanwhile, if it is determined "Yes" in step S4, the routine proceeds to step S5, and it is determined whether or not the power limit value $W_{limit}$ is equal to or lower than a preset second determination value W2 (lower limit determination value). The second determination value W2 functions as a threshold for determining whether or not it is possible to charge the drive battery 20, even when electric power is limited according to the power limit value $W_{limit}$. In other words, the second determination value W2 functions as a threshold for deciding whether to charge the drive battery 20 with electric power generated by the motor generator 11, or with electric power regenerated by the rear motor 5, as will be mentioned below. Hence, the second determination value W2 is set as the minimum usable electric power for charging the drive battery 20 (minimum electric power that can effectively increase SOC).

erates, and the regenerated electric power is used to charge the drive battery 20 (charging part).

In the next step S9, engine output is increased for the amount of regeneration load of the rear motor 5 (charging part), and the routine is ended. This processing has the same intention as the aforementioned step S7, and prevents the driver from feeling a sense of deceleration when driving force of the front wheels 4 is reduced due to the regeneration load on the rear motor 5. Hence, excellent drivability of the vehicle 1 can be maintained.

Next, the balance of electric power inside the vehicle 1 under the above-mentioned control of the vehicle ECU 27 will be described for each case.

In the following table, output of the engine (E/G) 3, the front motor (FM) 2, and the rear motor (RM) 5, the power generation amount of the motor generator (MG) 11, the charged amount of the drive battery 20, and the passing power of the boost converter (CVTR) 18 are normalized (nondimensionalized) for direct comparison, and it is assumed that there are no losses in the devices.

Accordingly, in the case of the upper row of Table 1, for example, a power generation amount 100 can be obtained by driving the motor generator 11 at an engine output of 100, and if the power generation amount 100 is distributed evenly to the front and rear motors 2, 5, an output of 50 each can be achieved. Note, however, that the tables are examples, and the invention is not limited to these, as a matter of course.

First, Table 1 below shows a case where the power limit value $W_{limit}$ of the boost converter 18 is equal to or lower than the first determination value W1 (Yes in step S1 of FIG. 3), and the drive battery 20 needs not be charged (No in step S4).

TABLE 1

| Drive mode | Clutch | E/G OUTPUT | MG POWER GENERATION AMOUNT | FM OUTPUT | RM OUTPUT | Battery charged amount | CVTR PASSING POWER |
| --- | --- | --- | --- | --- | --- | --- | --- |
| Series | Disconnected | 100 | 100 | 50 | 50 | 0 | 50 |
| Parallel | Connected | 100 | 0 | 0 | 0 | 0 | 0 |

If it is determined "No" in step S5, it is determined that the drive battery 20 can be charged with electric power generated by the motor generator 11, through the boost converter 18. In this case, the routine proceeds to step S6, where the engine 3 drives the motor generator 11, and the generated electric power is stepped down through the boost converter 18 and used to charge the drive battery 20 on the low voltage circuit side (charging part).

In the next step S7, engine output is increased for the amount of drive load of the motor generator 11 (charging part), and then the routine is ended. Since the engine 3 currently drives the front wheels 4, a reduction in driving force of the front wheels 4 due to the drive load on the motor generator 11 gives the driver a sense of deceleration. Accordingly, the increase in engine output ensures driving force of the front wheels 4 corresponding to the operation of the accelerator, so that excellent drivability of the vehicle 1 can be maintained.

Meanwhile, if it is determined "Yes" in step S5, it is determined that electric power generated by the motor generator 11 is limited in the boost converter 18, and cannot charge the drive battery 20 sufficiently. In this case, the routine proceeds to step S8, where the rear motor 5 regen- In series mode before switching, the clutch 8 is disconnected, the motor generator 11 generates an electric power of 100 by being driven at an engine output of 100, and the power generation amount 100 is evenly distributed to the front and rear motors 2, 5. Hence, the vehicle 1 is driven by driving the front wheels 4 and rear wheels 6 through the respective motors 2, 5 at an output of 50 each. At this time, the passing power of the boost converter 18 is 50, which is the amount supplied to the rear motor 5 side.

After switching to parallel mode, power generation of the motor generator 11 is stopped and the clutch 8 is connected, whereby the engine 3 drives the front wheels 4 at an output of 100 to drive the vehicle 1. As a result, power supply to the rear motor 5 side is stopped, and passing power of the boost converter 18 drops to 0.

Although the drive battery 20 need not be charged at this point, if battery power is used to drive the front motor 2 or the rear motor 5 during parallel mode due to shortage of engine driving force, thereafter, the lowered SOC of the drive battery 20 may require charging. Before transitioning into such a state, since the passing power of the boost converter 18 is brought down to 0 in the above example, the temperature of the boost converter 18 is lowered. Hence, the power limit value $W_{limit}$ based on the map of FIG. 2 increases and exceeds the first determination value W1, so that the vehicle ECU 27 proceeds from step S1 to step S2 of FIG. 3, and resumes the normal drive mode-switching control.

That is, in series mode, the passing power 50 exemplified above may be limited by the power limit value $W_{limit}$ in some cases, but may not in other cases. However, in any of these cases, while the traveling state of the vehicle 1 at that point is maintained by parallel mode, passing power is brought down to 0 to lower the temperature of the boost converter 18. Hence, the normal drive mode-switching control can be resumed promptly. Then, since the increased power limit value $W_{limit}$ has already reduced the power limit imposed on the boost converter 18 at the point of resumption, the drive battery 20 can be charged through the boost converter 18 without any hindrance.

As a result, according to the power controller of the hybrid vehicle 1 of the embodiment, a boost converter 18 is protected by limiting passing power when the temperature of the boost converter 18 rises, and a sufficient cruising range of the vehicle 1 can be ensured by avoiding reduction in the charged amount of the drive battery 20 due to the limitation of passing power, while the traveling state of the vehicle 1 at that point can be maintained.

Meanwhile, the following Table 2 shows cases where the drive battery 20 needs to be charged (Yes in step S4 of FIG. 3). The middle row shows a case where the power limit value $W_{limit}$ of the boost converter 18 is between the first determination value W1 and the second determination value W2 (No in Step S5), and the lower row shows a case where the power limit value $W_{limit}$ of the boost converter 18 is equal to or lower than the second determination value W2 (Yes in Step S5).

series mode, which indicates that the desired charged amount 20 cannot be achieved. However, since the passing power drops to the same value as the charged amount 20 after switching to parallel mode, the power limit is canceled. Hence, in this case, the charged amount of the drive battery 20 can be increased to the desired value 20, whereby a more prominent effect can be achieved for the charged amount of the drive battery 20.

Additionally, although redundant descriptions are omitted, since the lowered passing power lowers the temperature of the boost converter 18, there is also an effect that the normal drive mode-switching control can be resumed promptly.

Meanwhile, the case of the lower row deals with a more strict power limit imposed on the boost converter 18 than the case of the middle row, and therefore lowers the power generation amount of the motor generator 11 and the passing power of the boost converter 18 to 10. Then, electric power regenerated by the rear motor 5 is used to charge the drive battery 20, and make up for shortage of the charged amount of the drive battery 20. Since the rear motor 5 and the drive battery 20 are both on the low voltage circuit 21 side, the regenerated electric power from the rear motor 5 can be used to charge the drive battery 20 without passing through the boost converter 18 (with no power limit).

Then, as can be seen from a comparison between the lower row of Table 1 and the lower row of Table 2, the engine output is increased to make up for the regeneration load of the rear motor 5 caused by charging of the drive battery 20 (step S9 of FIG. 3). Accordingly, while maintaining the traveling state of the vehicle 1 by parallel mode, charging of the drive battery 20 can be continued by maintaining the desired charged amount 20. Note that the case of the lower row is similar to the case of the middle row

TABLE 2

| Drive mode | Clutch | E/G OUTPUT | MG POWER GENERATION AMOUNT | FM OUTPUT | RM OUTPUT | Battery charged amount | CVTR PASSING POWER |
|---|---|---|---|---|---|---|---|
| Series | Disconnected | 120 | 120 | 50 | 50 | 20 | 70 |
| Parallel | Connected | 120 | 20 | 0 | 0 | 20 | 20 |
| Parallel | Connected | 120 | 10 | 0 | −10 (Regeneration) | 20 | 10 |

The difference from Table 1 of the series mode before switching is that the engine output and the power generation amount of the motor generator 11 are increased (100→120), and the increased amount 20 is used to charge the drive battery 20 through the boost converter 18. Hence, the increased amount 20, together with the supply amount 50 to the rear motor 5 side, increases the passing power of the boost converter 18 to 70.

In the case of the middle row, since power supply to the rear motor 5 side is stopped after switching to parallel mode, passing power of the boost converter 18 drops to 20, which is equal to the charged amount of the drive battery 20. Then, as can be seen from a comparison between the lower row of Table 1 and the middle row of Table 2, the engine output is increased to make up for the drive load of the motor generator 11 caused by charging of the drive battery 20 (step S7 of FIG. 3). Accordingly, while maintaining the traveling state of the vehicle 1 by parallel mode, charging of the drive battery 20 can be continued by maintaining the desired charged amount 20.

Also, sometimes the passing power 70 may be limited to a lower value according to the power limit value $W_{limit}$ in also in that the lowered passing power lowers the temperature of the boost converter 18.

There are different advantages in charging the drive battery 20 by use of electric power generated by the motor generator 11 as in the case of the middle row, and by use of electric power regenerated by the rear motor 5 as in the case of the lower row. Even when electric power is generated by the motor generator 11, the driving state of the traveling vehicle 1 does not change, and driving force is basically generated in the front wheels 4 as in the normal parallel mode. Hence, the driver can continue driving without feeling discomfort, and therefore this case exerts higher drivability of the vehicle 1. However, since a power limit imposed on the boost converter 18 is applied to the electric power generated by the motor generator 11 when charging the drive battery 20, if the power limit drops to the second determination value W2 which is the minimum usable charge power, it is substantially impossible to charge the drive battery 20.

On the other hand, since electric power regenerated by the rear motor 5 can be used to charge the drive battery 20 regardless of the power limit imposed on the boost converter 18, this case exerts higher battery chargeability. On the other hand, since the braking force regenerated by the rear motor 5 acts on the rear wheels 6, the behavior of the traveling vehicle may change and cause discomfort to the driver.

Against this background, as has been described with reference to the flowchart of FIG. 3, in the embodiment, the drive battery 20 is first charged by generating electric power by the motor generator 11, and when it cannot be continued due to the power limit imposed on the boost converter 18, battery charging is continued by switching to regeneration by the rear motor 5. Hence, the charged amount of the drive battery 20 can be increased as much as possible while ensuring excellent drivability.

Although this is the end of the description of the embodiment, the form of the present invention is not limited to the embodiment. For example, although the invention is embodied as a power controller of the four-wheel drive hybrid vehicle 1 in the above embodiment, it is also applicable to a two-wheel drive (front-wheel drive or rear-wheel drive) hybrid vehicle 101.

Figure 4:
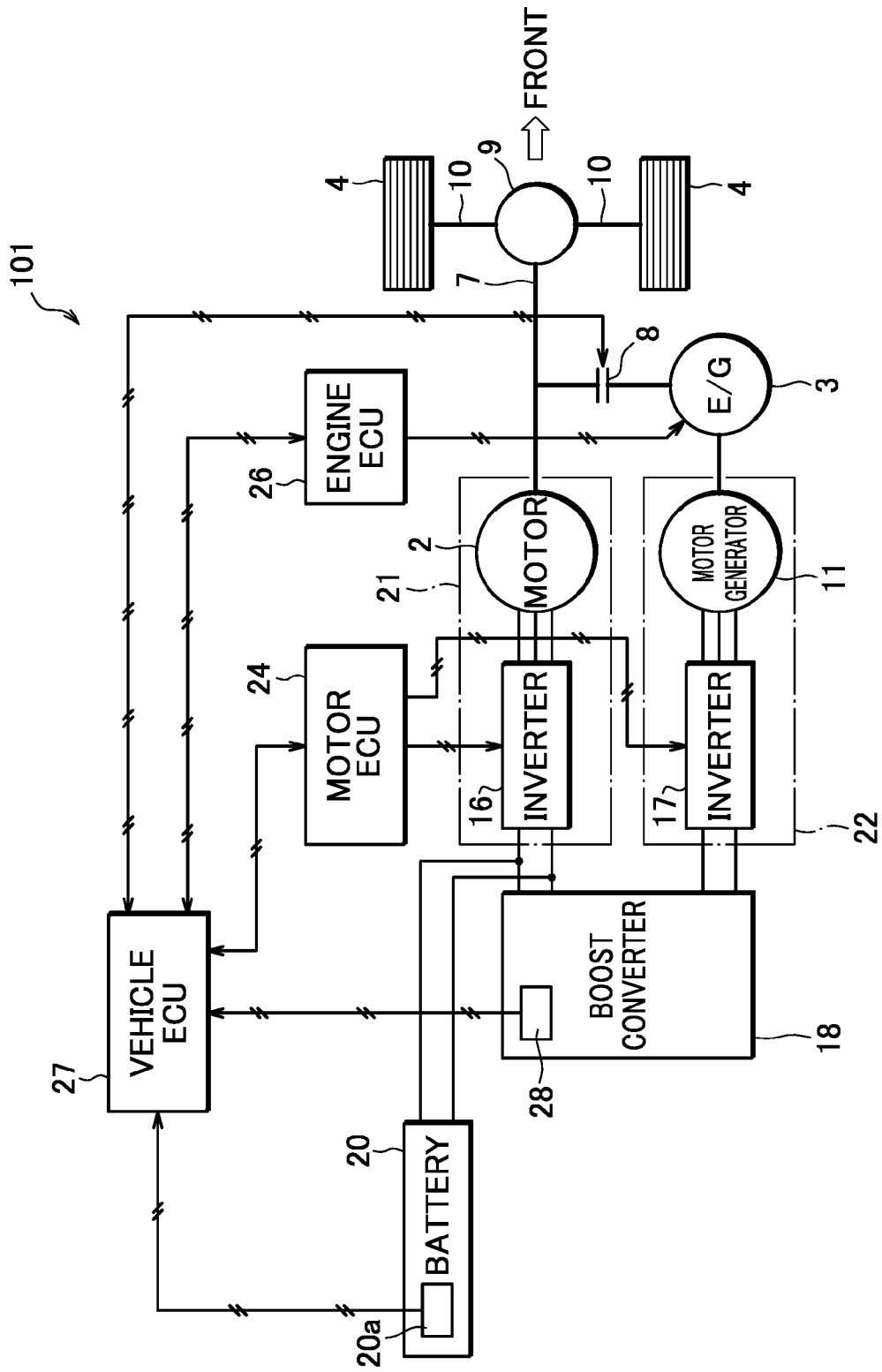
FIG. 4 is an overall configuration diagram of another example in which the present invention is applied to a front-wheel drive hybrid vehicle.

FIG. 4 shows another example in which the invention is applied to the front-wheel drive hybrid vehicle 101. The mechanical configuration is the same as the embodiment shown in FIG. 1, and this example is different only in that the front motor 2 is referred to as a motor 2, and the front motor ECU 24 is referred to as a motor ECU 24. Note, however, that while a motor generator 11 and an inverter 17 are connected to a boost converter 18 and form a high voltage circuit 22 as in the case of the embodiment, this example is different in that the motor 2 and an inverter 16, together with a drive battery 20, form a low voltage circuit 21.

In this configuration, the motor (first drive motor) 2 functions as the rear motor 5 of the above embodiment. That is, in series mode, electric power generated by the motor generator 11 and stepped down by the boost converter 18 is supplied to the motor 2, and the motor 2 drives front wheels 4 (first drive wheel) to drive the vehicle 101. In parallel mode, stoppage of the power supply lowers the passing power of the boost converter 18, and when charging the drive battery 20, part of the engine driving force is used to regenerate. Hence, although redundant descriptions are omitted, various effects similar to the embodiment can be achieved.

The invention claimed is:

1. A power controller of a hybrid vehicle comprising:
   a first drive motor that drives any one of a front wheel and a rear wheel of a vehicle;
   an engine that drives the one wheel or the corresponding other one of the front wheel and the rear wheel of the vehicle through a clutch;
   a generator that is driven by the engine; and
   a voltage transformer that steps down generated electric power supplied to the first drive motor and a battery from the generator, wherein:
   the power controller further comprises
      a limitation part comprising a sensor that limits passing power of the voltage transformer according to the temperature of the voltage transformer, and
      a connection part comprising a controller that switches connection of the clutch; wherein
   the connection part is configured to connect the clutch when the passing power of the voltage transformer is limited by the limitation part.

2. The power controller of a hybrid vehicle according to claim 1, further comprising a second motor to which at least one of generated electric power from the generator and electric power discharged from the battery and stepped up by the voltage transformer is supplied to drive the other wheel.

3. The power controller of a hybrid vehicle according to claim 1, wherein
   the first drive motor and the engine drive the same wheel.

4. The power controller of a hybrid vehicle according to claim 1, wherein:
   the limitation part comprises a controller configured to limit passing power of the voltage transformer more strictly as the temperature of the voltage transformer increases;
   the power controller further comprises
      an estimation part comprising a battery monitor configured to estimate the state of charge (SOC) of the battery, and
      a charging part comprising a controller configured to control charging of the battery; and
   when the connection part connects the clutch according to the limit on passing power of the voltage transformer, if it is determined that the battery needs to be charged on the basis of the SOC estimated by the estimation part, and it is also determined that a value of passing power of the voltage transformer limited by the limitation part exceeds a preset lower limit determination value, the charging part causes the engine driving the one or other wheel to drive the generator, steps down the generated electric power by the voltage transformer, and uses it to charge the battery.

5. The power controller of a hybrid vehicle according to claim 2, wherein:
   the limitation part limits passing power of the voltage transformer more strictly as the temperature of the voltage transformer increases;
   the power controller further comprises
      an estimation part comprising a battery monitor configured to estimate the state of charge (SOC) of the battery, and
      a charging part comprising a controller configured to control charging of the battery; and
   when the connection part connects the clutch according to the limit on passing power of the voltage transformer, if it is determined that the battery needs to be charged on the basis of the SOC estimated by the estimation part, and it is also determined that a value of passing power of the voltage transformer limited by the limitation part exceeds a preset lower limit determination value, the charging part causes the engine driving the one or other wheel to drive the generator, steps down the generated electric power by the voltage transformer, and uses it to charge the battery.

6. The power controller of a hybrid vehicle according to claim 3, wherein:
   the limitation part limits passing power of the voltage transformer more strictly as the temperature of the voltage transformer increases;
   the power controller further comprises
      an estimation part comprising a battery monitor configured to estimate the state of charge (SOC) of the battery, and
      a charging part comprising a controller configured to control charging of the battery; and
   when the connection part connects the clutch according to the limit on passing power of the voltage transformer, if it is determined that the battery needs to be charged on the basis of the SOC estimated by the estimation part, and it is also determined that a value of passing power of the voltage transformer limited by the limitation part exceeds a preset lower limit determination value, the charging part causes the engine driving the one or other wheel to drive the generator, steps down the generated electric power by the voltage transformer, and uses it to charge the battery.

7. The power controller of a hybrid vehicle according to claim 4, wherein when the connection part connects the clutch according to the limit on passing power of the voltage transformer, if it is determined that the battery needs to be charged on the basis of the SOC estimated by the estimation part, and it is also determined that the value of passing power of the voltage transformer limited by the limitation part is equal to or lower than the lower limit determination value, the charging part causes the first drive motor to regenerate, and uses the regenerated electric power to charge the battery.

8. The power controller of a hybrid vehicle according to claim 4, wherein when causing the engine to drive the generator, the charging part increases output of the engine for the amount of drive load of the generator.

9. The power controller of a hybrid vehicle according to claim 7, wherein when causing the first drive motor to regenerate, the charging part increases output of the engine for the amount of regeneration load of the first drive motor.

* * * * *